United States Patent [19]

Szcupak

[11] Patent Number: 4,527,673
[45] Date of Patent: Jul. 9, 1985

[54] MULTI-PURPOSE FLUID SEAL FOR MOVEMENT CONTROL DAMPERS AND THE LIKE

[75] Inventor: Peter Szcupak, Park Ridge, Ill.

[73] Assignee: Chicago Rawhide Manufacturing Company, Elgin, Ill.

[21] Appl. No.: 418,945

[22] Filed: Sep. 16, 1982

[51] Int. Cl.³ .................. F16F 9/06; F16F 9/36; F16J 15/32

[52] U.S. Cl. .............. 188/269; 188/322.17; 277/37; 277/153

[58] Field of Search ........ 188/269, 314, 315, 322.16, 188/322.17, 322.19, 322.21; 92/86; 267/8 R, 64.15, 64.16, 64.17, 64.18, 64.19, 64.21, 64.22, 64.23, 64.24, 64.25, 64.26, 64.27, 64.28; 277/35, 37, 153

[56] References Cited

U.S. PATENT DOCUMENTS

| | | | |
|---|---|---|---|
| 3,979,134 | 9/1976 | Keijzer et al. | 267/64.16 |
| 4,183,509 | 1/1980 | Nishikawa et al. | 267/8 R |
| 4,189,033 | 2/1980 | Katsumori | 188/322.17 |
| 4,357,026 | 11/1982 | Panchetti | 277/153 |
| 4,364,457 | 12/1982 | Wössner et al. | 188/322.17 |
| 4,433,846 | 2/1984 | Romero et al. | 277/153 |

FOREIGN PATENT DOCUMENTS

| | | | |
|---|---|---|---|
| 562388 | 8/1958 | Canada | 267/8 R |
| 2144795 | 3/1973 | Fed. Rep. of Germany | 267/64.26 |
| 557763 | 2/1957 | Italy | 267/8 R |
| 987111 | 3/1965 | United Kingdom | 267/64.23 |
| 1142107 | 2/1969 | United Kingdom | 188/322.17 |

Primary Examiner—Douglas C. Butler
Assistant Examiner—Richard R. Diefendorf
Attorney, Agent, or Firm—James T. FitzGibbon

[57] ABSTRACT

A fluid seal for a liquid and gas-filled damper mechanism. The seal includes a casing and a primary lip body subdivided into two portions, one portion being adapted to provide a fluid seal with an associated reciprocable rod, and the other to provide a one-way relief valve action to bleed fluid from one side of the lip body to the other when higher pressure is on the rod side; and to increase the sealing force when the higher pressure is on the other side of the lip body opposite the rod.

5 Claims, 5 Drawing Figures

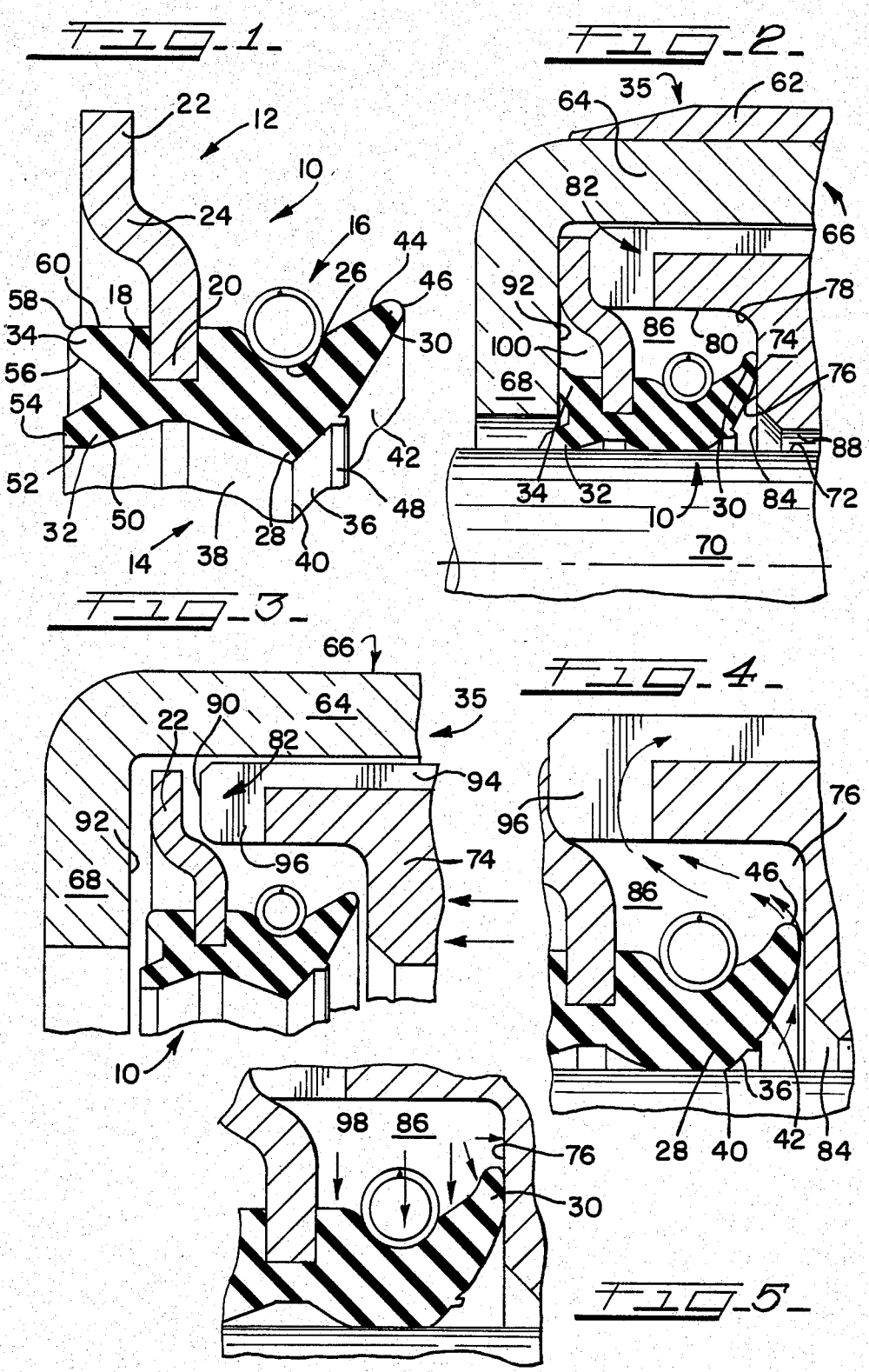

MULTI-PURPOSE FLUID SEAL FOR MOVEMENT CONTROL DAMPERS AND THE LIKE

The present invention relates generally to fluid seals, and more particularly, to multi-purpose specialty seals used in motion control dampers and the like.

In recent years, there has been an increase in activity in the development of movement control dampers, commonly called "shock absorbers" or sometimes merely "shocks", used as portions of vehicle suspension components and otherwise.

There has been considerable improvement in the size and capacity of such units, with many such dampers having a number of internal control devices adapted to provide excellent damping and rebound control, often having variable rate and other sophisticated features which permit highly improved performance. However, as with all movement dampers, including those provided in a unitized package with an associated spring, such as so-called McPherson Struts, there has been a continuing problem of meeting various difficult sealing requirements.

Thus, a so-called shock absorber seal is required to exclude contaminants from the exterior of the housing. This requirement is often fairly severe, insasmuch as the shock or damper must be exposed to road conditions over a period of many years. The damper is exposed to grit, sand dirt, water, and extremes of temperature. In addition, the seal must permit axial movement of a rod or the like thereto to provide a certain thin film of lubricant, as well as confinement of liquid to regions within the shock body. This in turn calls for good sealing action, in view of the large number of operating cycles through which such a shock or damper is required to perform during its life.

Still further, with modern dampers, it is customary to provide a gas retaining portion as well as a fluid retaining portion. In this connection, it will be understood that as the damping fluid moves through control orifices from one side of the piston to the other within the cylinder to provide damping action, the fluid displaced from one side of the piston must be accommodated on the other side thereof. Inasmuch as the piston contains an operating rod extending axially from one end of the piston to and through one outer end of the damping unit, reciprocation of the piston within the damper involves not only displacing fluid from one side of the piston to the other through a flow control mechanism, but also requires that means be provided to accommodate liquid displaced by the rod during piston movement. When the damper is in its fully compressed position, the overall interior volume thereof is less than when the damper is in its fully extended position, because in the compressed position, a portion of the rod also lies within the damper.

In view of the incompressible nature of the damping fluid, this volume change, which occurs to a greater or less extent with every stroke, is accommodated by the provision of a gas or vapor which is highly compressible relative to the liquid. In some designs, the gas is kept separate and moves into its separate storage area, and another design, the damper operates with the fluid in emulsion form. In either case, at maximum compression, the volume of the liquid is substantially undiminished while the gas undergoes compression. Where emulsion occurs, after the unit is permitted to achieve static position, the gases theretofore dissolved or emulsified are demulsified. Consequently, in a sealing application for a movement control damper, it is necessary to provide a static seal for gas, usually providing such seal from the gas reserve cavity to the outside, along a path separate from that along which the seal against fluid leakage is provided.

According to the present invention, it is desired to provide a new and improved seal for movement control assemblies, and specifically a seal which provides good dirt exclusion, good fluid retention and gas retention in both the static and dynamic conditions. It is further desired to provide a seal wherein the existence of gas pressure under working conditions does not adversely affect the radial load of the seal so as either to permit leakage or to cause undue wear.

In view of the heretofore unsatisfied need for a seal of the type just desribed, it is an object of the present invention to provide an improved fluid seal for gas or vapor and liquid co-existing in the same application.

Another object of the invention is to provide a fluid seal which will seal low viscosity fluids such as gases and vapors, as well as liquids such as synthetic oils, mineral oils, and the like.

Another object of the invention is to provide a seal which will provide lubrication of the shaft moved axially therethrough without permitting undue leakage.

A still further object of the invention is to provide a fluid seal which provides one or more lips for excluding dirt from the interior of the sealed region, and which also serve as a wiper lip for the rod forming a part of the movement control assembly.

An even further object of the invention is to provide a seal design wherein the liquid seal body also serves as the gas seal body, using different surfaces of the same body to achieve the desired sealing effect.

Another object of the invention is to provide a seal design wherein both and gas and gas or vapor and liquid seals are provided by a single element.

A further object of the invention is to provide a fluid seal having a single elastomeric body and providing at least four engagement or seal band surfaces.

A still further object of the invention is to provide a fluid seal which may be manufactured by existing techniques without specialized equipment and which seal may be readily removed from the mold after manufacture.

An even further object of the invention is to provide, in one embodiment, a fluid seal wherein two separate gas or vapor seals are provided so that gas leakage in the second sealed region will not adversely affect the overall performance of the seal.

Another object of the invention is to provide a composite oil seal having a stiffening or mounting portion which is of simple, easy-to-install cross-section.

A still further object of the invention is to provide a fluid seal which includes a pair of seal lips to resist fluid leakage and a pair of lips adapted to engage the primary sealing surface, namely, a reciprocable rod extending through the unit.

A further object of the invention is to provide a unit wherein the casing permits simplified mounting and reliable installation in use.

Yet another object of the invention is to provide a fluid seal which will permit gas or vapor flow in one direction only from a first sealed region to a second sealed region, but which will prevent fluid flow in a reverse direction between these regions.

The foregoing and other objects and advantages of the invention are achieved in practice by providing a composite seal member which includes a casing portion and an elastomeric seal body bonded thereto with the seal body providing an excluder lip, a primary liquid seal lip and a pair of gas or vapor sealing lips, each forming a part of the primary seal body and adapted to insure against leakage in both the static and dynamic conditions of the seal, with at least one of the fluid sealing lips being formed integrally with the primary liquid seal lip and able to be urged into a position of engagement with another part of an associated machine member by its own inherent resiliency.

The exact manner in which the foregoing and other objects and advantages of the invention are achieved in practice will become more clear when reference is made to the foregoing detailed description of the preferred embodiments of the invention set forth by way of example and shown in the accompanying drawings, wherein like reference numbers indicate corresponding parts throughout.

BRIEF DESCRIPTION OF THE DRAWINGS

FIG. 1 is a fragementary vertical sectional view, on an enlarged scale, showing a preferred form of seal made according to the invention;

FIG. 2 is a fragmenty vertical sectional view, on a reduced scale, showing the seal as installed in a hydraulic movement control damper or the like, and showing two sealed regions, as well as other portions of the sealed mechanism and a region exterior thereto;

FIG. 3 shows the seal of FIG. 2 just prior to completing the installation thereof;

FIG. 4 shows one operating mode of the seal of the invention;

FIG. 5 shows another aspect of the operation of the seal of the invention.

DESCRIPTION OF THE PREFERRED EMBODIMENTS OF THE INVENTION

While the invention is not intended to be limited to any particular application or to seal any particular type of mechanism, the description herein given is one of a motion control damper having a control piston with a damper rod attached thereto, moving reciprocably within a housing which includes one or more fluid flow control valves and wherein the sealed media include both an oil such as a mineral oil and a gas or vapor, such as nitrogen or a fluorocarbon ("Freon").

Referring now to the drawings in greater detail, FIG. 1 shows a seal assembly generally designated 10 and shown to include a stiffener or seal casing generally designated 12, an elastomeric seal body generally designated 14, and a radially acting garter spring unit 16. The elastomeric seal body 14, which is conventionally made of a synthetic elastomer, includes a bonding portion 18 which surrounds a radially inwardly extending portion 20 of the casing 12, and which is bonded securely thereto in a known manner. The casing 12, is customarily made from metal, is shown to include a radially outermost or mounting portion 22, an intermediate stepped or offsetting portion 24, and the innermost or bonding portion 20 just referred to. While steel is a preferred material from which the casing 12 or the like is made, it may be also made of other metals or relatively rigid materials to which an elastomer may be fastened, as by bonding or otherwise.

The elastomeric body portion 14 is shown to include a number of principal components, including a groove 26 for locating the spring 16, a radially acting primary lip area 28 adapted to provide a seal for a first sealed region, an axially acting second lip 30 adapted to provide a unique sealing and valve action for a second sealed region, a so-called dirt or excluder lip 32 and an auxiliary gas and fluid lip 34 to insure backup sealing of the second sealed region, as will appear.

As will be further seen by reference to FIG. 1, the elastomeric body 14 includes a so-called oil side frusto-conical surface 36 and an air side frusto-concial surface 38 which meet along a generally circular locus forming a primary seal band 40. The second lip 30 is defined by an extension 42 of the frusto-conical surface 36, which may have the same or a different taper than that of the surface 36, a contoured, preferably frusto-conical annular surface 44 facing generally radially outwardly and joined to the surface 42 by an annular transition surface 46 which is referred to in detail elsewhere herein. An annular projection 48 lies between the surfaces 36, 42, such projection being a "tear trim" area formed in the production of the seal by separation of the part from the scrap lying in the sprue or inlet opening of the mold.

Referring now to the excluder lip 32, it will be noted that a frusto-conical surface 50 having a taper opposite to that of the surface 38 is provided, and that this surface 50 or an extension 52 thereof meets a generally radially directed annular surface 54 with the surfaces 50, 52, 54 combining to form an excluder lip functioning in a known manner to exclude contaminants from the sealed region. The seal body 14 further includes another frusto-concial, outwardly directed surface 56 terminating at an annular transistion surface 58 which, in turn, is joined to a generally axially extending annular surface 60, with the surfaces just referred combining to define an auxiliary lip 34 for the second sealed region, as will appear.

Referring now to FIGS. 2–3, details of the sealed mechanism and the method of installing the seal 10 therein are shown. Assuming the application to be a motion damper or shock absorber generally designated 35, one end thereof is seen to include an outer protective cylindrical shell 62, tightly press fit over the cylindrical portion 64 of the shock body 66, which body terminates in a radially inwardly directed end flange 68. Another portion of the sealed mechanism 35 includes a reciprocable rod 70 having a cylindrical, radially outwardly directed surface 72. A portion of the shock absorber mechanism 35 also includes a valve body 74 which is also cylindrical and lies between the cylinder 64 and the rod 70. This body 74 includes a countersunk end wall 76, a radius or corner 78 and a countersink cylinderal wall section 80. A radial passage generally designated 82 is also provided to permit fluid flow, as will appear. In FIG. 2, the primary sealed region is shown as 84 and lies between the innermost cylindrical surface 88 of the valve body 74 and the outer surface 72 of the rod 70. The second sealed region 86 lies between the passage 82 and the radially outwardly directed surface of the seal body 14.

Referring now to FIG. 3 an exploded view shows certain additional components of the shock absorbers 35, namely, an end face surface 90 on the valve body 74, and an axially inwardly facing end wall 92 on the flange 68. While the passage 82 may assume any desired configuration, it is customarily formed by an axially extending surface 94 and a radially extending slot or bore 96 which communicate with a remote end of the assembly 35.

Referring again to FIG. 3, one method of installing the seal 10 is shown.

One method of assembling the shock absorber 35 or the like is to hold the cylinder 64 stationery and to position the seal assembly 10 therein, with the casing 12 spaced just apart from the inner surface 92 of the flange 68. Thereupon, the valve body 74 is inserted in the other end of the unit 35 and moves in the direction shown by the arrows, until the end face surface 90 of the body 74 pinches the mounting portion 22 of the stamping 12 between itself and the inner face 92 of the flange 68. The body 74 is then permanently secured in place, such as by welding or other locking action. Thereafter, the rod 70 is inserted into the body, with the piston affixed to the inner end thereof, passing through the pre-lubricated inner diameter of the seal body 14. In the alternative, the seal may be pre-positioned over the rod 70 and the rod and the shock body 66 pressed thereover; at any rate, the seal is conveniently secured against axial and radial movement, either as shown or otherwise.

Referring now to FIGS. 4 and 5, the operation of the seal 10 is shown. When conditions inside the shock body create high pressure in the first sealed region 84, tendency of the oil to leak beneath the seal band portion 40 of the primary lip area 28 is resisted by the radial compressive load of the seal. If the pressure in this area 84 becomes excessive, a certain amount of the fluid may then flow, in the direction shown by the arrows, through the small space 96 transiently formed between the surfaces 46, 76 on the seal and the valve body, respectively. Because the surface area of the seal exposed to the fluid in the second seal area 86 is greater than that acting on the frusto-conical surfaces 36, 42, then the tendency of the seal to lift from the shaft or rod 70 is minimized. However, intermittent shocks or high pressure pulsations act to create the relief valve action shown in FIG. 4, namely, the transient lifting of the lip 30 away from the wall 76.

FIG. 5 shows the second aspect of the sealing action of the seal 10 and illustrates by arrows 98 that there is always a certain static pressure in the second sealed region 86.

In this instance, the entire secondary lip 30 is urged radially inwardly, with an axially inwardly extending component also urging the lip 30 against the wall 76. Thus, higher pressure in this area merely increases the sealing force and insures that the valve action shown in FIG. 4 is a one way action only. With certain damper designs, including those with which the seal of the invention is to be used, some created by the gas used in the unit is commonly present in the region 86, especially during non-use of the shock absorber. In the prior art, there was a tendency of this gas, which is necessarily present in most or all shock absorbers, to leak from the sealed unit.

Another aspect of the invention is illustrated in FIG. 2, which shows that, in use, both the dirt lip 32 of the seal and the auxiliary gas and fluid lip 34 are also operative. The lip 34 snugly engages the end wall 92 of the flange 68, and has an inherent elastomeric action similar to that of the lip 30, as well as a tendency to remain more securely sealed with an increase in gas or fluid pressure. Unlike the lip 30, the lip 34 is not exposed to unseating forces, because the side not exposed to the gas or other fluid in the second sealed region 86 is exposed only to the atmosphere.

Likewise, the excluder lip 32 fits snugly over the seal, but works in a relatively more dry atmosphere and serves to clean the rod, acting as a wiper to insure that contamination is not permitted to pass into the area of the primary seal band 40. Provision of the second lip 34 is a preferred construction because the possibility of gas or other fluid leakage along the wall 92 is present when the seal is installed, as well as thereafter. Thus, any leakage which might occur between the outwardly directed face of the flange 22 and the surface 92 may be contained in the region 100 (FIG. 2), which may be though of as in communication with, or forming a part of the second sealed region 81.

Accordingly, the present invention is shown to provide a simplified seal which provides good wiping action, excellent primary sealing force, and the ability to absorb rapid fluctuations in force by a venting action, as well as the ability to serve as a one way valve or vent, further coupled with the ability to prevent escape of gas from a second sealed region, even under static conditions and over a long time period.

In this connection, it will be realized that shock absorbers of different designs include both emulsified gas as well as gas which is kept separate from the fluid by bags, movable pistons, or otherwise periodically passed to and from an auxiliary or variable volume chamber. According to the present invention, such gas, whether being intentionally present as a separate phase, or emulsified in the fluid, can be effectively sealed and maintained in the desired region of the shock absorber for optimal motion control, minimum frothing and heat loss for long term performance stability. The present invention satisfies all of these requirements at minimal cost and is able to be manufactured to exacting tolerances at reasonable costs by known techniques.

It will thus be seen that the present invention provides an improved fluid seal for motion control dampers and the like, having a number of advantages and characteristics including those pointed out above and others which are inherent in the invention. A preferred embodiment of the invention having been described by way of illustration, it is anticipated that changes and modifications of the described fluid seal will occur to those skilled in the art, and that such changes and modifications may be made without departing from the spirit of the invention or the scope of the appended claims.

I claim:

1. A fluid seal unit for use in retaining fluids within an associated sealed mechanism having relatively movable parts defining at least one of a pair of fluid-receiving and retaining regions within said mechanism, said seal unit comprising, in combination, a relatively rigid casing unit adapted to be received and retained within a portion of said sealed mechanism, said casing unit having a radially inner bonding portion, and a seal body bonded to said bonding portion of said casing unit and including a primary lip body portion and a secondary lip body portion, with said primary lip body portion lying on the axially inner side of said bonding portion of said casing unit and being adapted to subdivide the sealed mechanism into radially inner and outer sealed regions and to provide a radially inwardly acting primary seal band around the outer diameter of a reciprocable rod extending through said seal unit, as well as to provide an end face type relief valve seal between said radially inner and outer sealed regions, said primary lip body portion including axially inner and outer frusto-conical surfaces meeting each other along a generally circular locus to define said radially inwardly acting primary seal band, and with said axially inner frusto-conical surface being directed toward and defining a portion of said radially inner sealed region, said primary lip body portion further including a radially outwardly facing contoured surface extending generally axially and including a spring-receiving groove therein, an annular, axially inwardly, radially outwardly tapering marginal surface and a contoured annular end face surface extending between and joining respective axially inner margins of said axially inner frusto-conical primary lip body portion surface and said tapering marginal surface, said tapering marginal surface and said end face surface thereby defining a flexible relief valve body as an integral extension of said primary lip body portion, said secondary lip body portion including at least one surface acting radially inwardly on one of said movable parts to define an excluder seal band thereon.

2. A fluid seal unit as defined in claim 1 wherein said casing unit includes a radially extending locating flange adapted to be received and retained between a pair of oppositely directed, axially spaced apart surfaces forming parts of said sealed mechanism.

3. A fluid seal unit as defined in claim 1 wherein said secondary lip body portion further includes an at least partially axially directed sealing lip adapted to engage a portion of said sealed mechanism along a seal band formed between an axially outermost portion of said sealing lip and a second radially extending portion of said sealed mechanism.

4. A fluid seal unit as defined in claim 1 which further includes an annular garter spring surrounding and in snug engagement with said spring receiving groove in said primary lip body portion, said garter spring acting through said seal body to provide increased load.

5. A sealed mechanism which includes a fluid containing cylindrical housing closed at one end and having an opening at the other end thereof, a piston received within said housing and adapted for a reciprocation therein, a reciprocable rod affixed to said piston and extending through said opening at said other end of said housing, and a fluid seal unit received within said opening and closing off the portion thereof surrounding said rod, a valve body received within said housing and lying between said piston and said other end of said housing, said valve body including a radially extending annular end face surface thereon adapted to cooperate with an end face of an associated seal to provide a relief valve action, said fluid seal unit being adapted to retain fluids within said sealed mechanism, said seal unit comprising, in combination, a relatively rigid casing unit received and retained within said end portion of said housing, said casing unit having a radially inner bonding portion, and a seal body bonded to said bonding portion of said casing unit and including a primary lip body portion and a secondary lip body portion, with said primary lip body portion lying on the axially inner side of said bonding portion of said casing unit and subdividing said sealed mechanism into radially inner and outer sealed regions and providing a radially inwardly acting primary seal band around the outer diameter of said reciprocable rod and further cooperating with said end face surface on said valve body to provide an end face type relief valve seal between said radially inner and outer sealed regions, said primary lip body portion including axially inner and outer frusto-conical surfaces meeting each other along a generally circular locus to define said radially inwardly acting primary seal band, and with said axially inner frusto-conical surface being directed toward and defining a portion of said radially inner sealed region, said primary lip body portion further including a radially outwardly facing contoured surface extending generally axially and including a spring-receiving groove therein, an annular, axially inwardly, radially outwardly tapering marginal surface and a contoured annular end face surface extending between and joining respective axially inner margins of said axially inner frusto-conical primary lip body portion surface and said tapering marginal surface, said tapering marginal surface and said end face surface thereby defining a flexible relief valve body as an integral extension of said primary lip body portion, said secondary lip body portion including at least one surface acting radially inwardly on said rod to define an excluder seal band thereon.

* * * * *